T. B. FARRINGTON.
VALVES FOR ENGINES.
APPLICATION FILED MAR. 19, 1913.
1,079,643.
Patented Nov. 25, 1913.
2 SHEETS—SHEET 2.
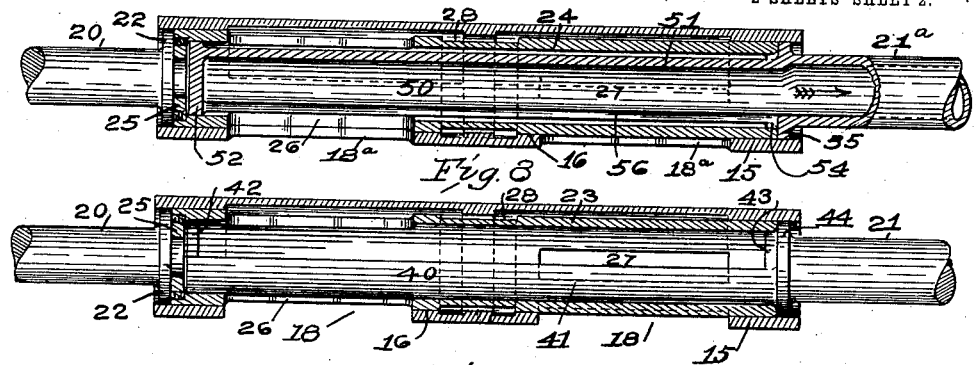
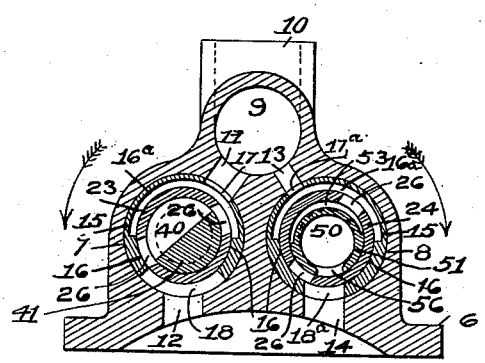
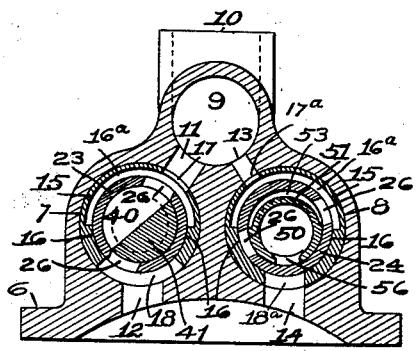
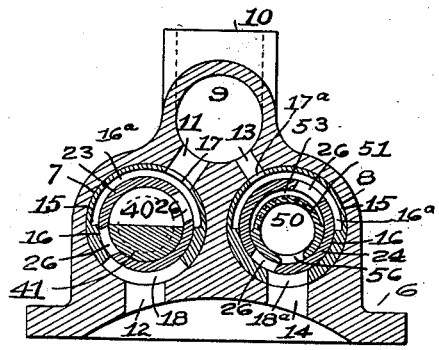
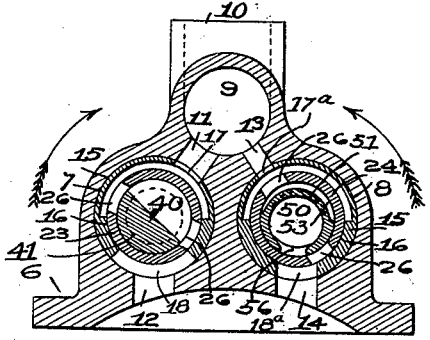
WITNESSES:
G. M. Gridley
L. K. Hoffman
INVENTOR.
Thayer B. Farrington
BY
C. E. Blanchard
ATTORNEY.
COLUMBIA PLANOGRAPH CO., WASHINGTON, D. C.

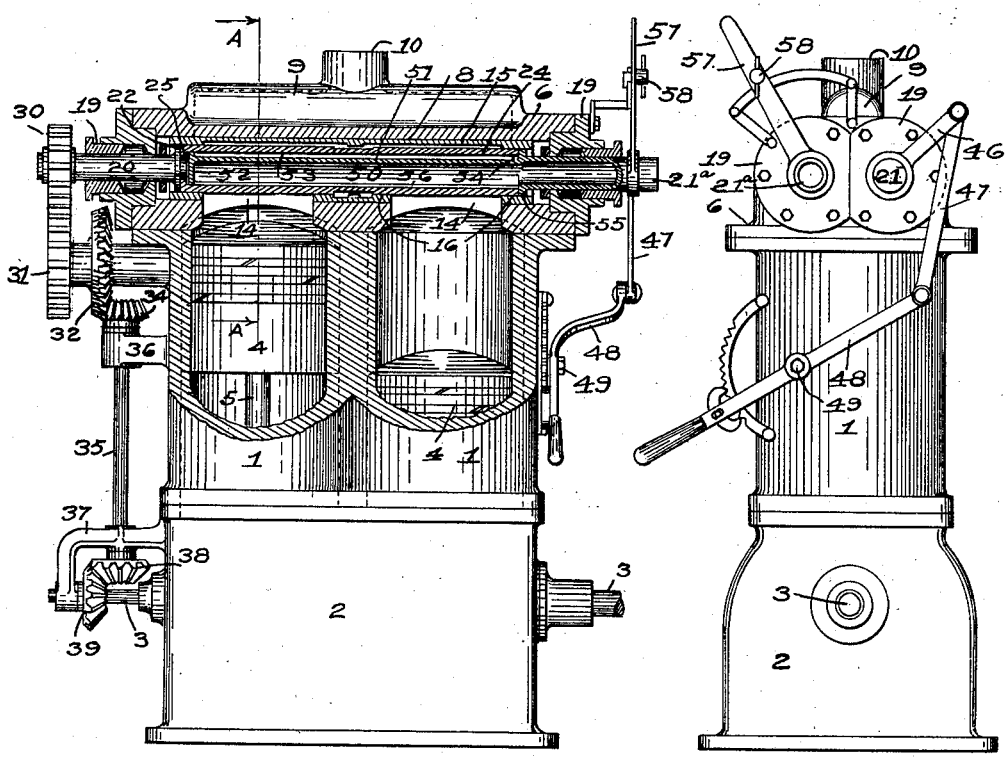
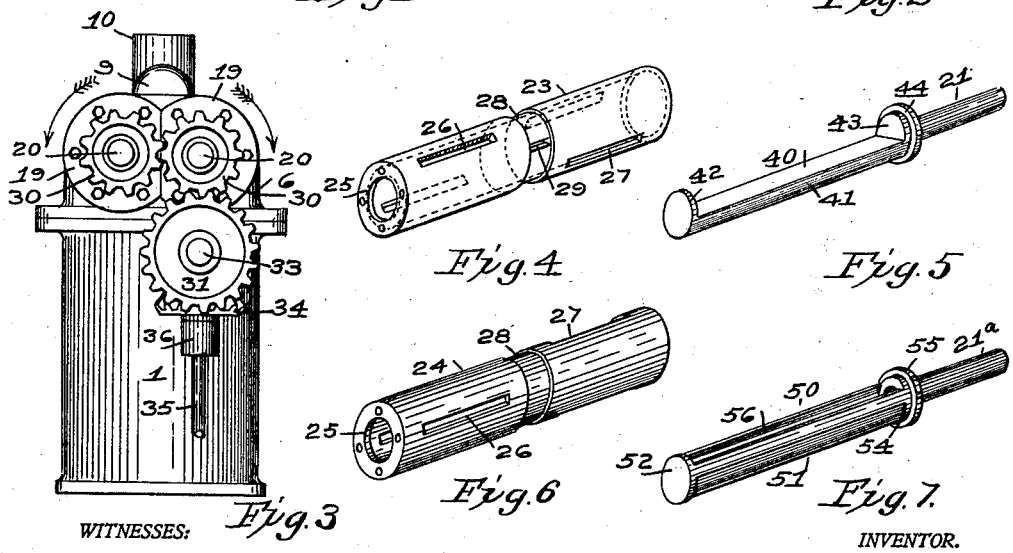

UNITED STATES PATENT OFFICE.

THAYER B. FARRINGTON, OF COLUMBUS, OHIO.

VALVES FOR ENGINES.

1,079,643.  Specification of Letters Patent.  Patented Nov. 25, 1913.

Application filed March 19, 1913. Serial No. 755,288.

*To all whom it may concern:*

Be it known that I, THAYER B. FARRINGTON, a citizen of the United States, residing at Columbus, in the county of Franklin and State of Ohio, have invented new and useful improvements in the construction and mode of operation of valves for engines operated by steam or other expansible gas, of which the following is a specification.

My invention relates to improvements in the construction and mode of operation of valves for engines operated by steam or other expansible gas, and the objects of my improvement are:—1st: to provide a valve construction that will admit of perfect control of the valve periods, namely, admission, cut-off, exhaust and expansion. 2nd: to provide the means for adjusting each of these periods independently while the engine is in operation. 3rd: to provide a valve construction that will have a positive action under any speed. I attain these objects by the devices shown in the accompanying drawings which form a part of my application for Letters Patent, and in which—

Figure 1 is a front view, partly in vertical section, of a two cylinder engine. Fig. 2 is a view of the right side of Fig. 1 showing the adjustment controlling levers. Fig. 3 is a view of the left side of the upper part of Fig. 1 showing the valve driving mechanism. Fig. 4 is a perspective view of the inlet valve. Fig. 5 is a perspective view of the inlet valve controller. Fig. 6 is a perspective view of the exhaust valve. Fig. 7 is a perspective view of the exhaust valve controller inverted. Fig. 8 is a vertical longitudinal section through the exhaust valve, bushing and controller. Fig. 9 is a vertical longitudinal section through the supply valve, bushing and controller. Fig. 10 is a vertical, transverse section through the valve chamber on line A.—A. of Fig. 1 showing the starting positions of the inlet and exhaust valves and controllers. Fig. 11 is a view similar to Fig. 10 but showing the positions of the valves and controllers when steam is cut off and during expansion. Fig. 12 is also a view similar to Fig. 10 but showing the positions of the supply controller when the engine is at rest. Fig. 13 is also a view similar to Fig. 10 but showing the controllers in position to reverse the engine.

Similar characters indicate similar parts throughout the several views.

In the drawings 1 represents a pair of steam cylinders mounted vertically on a base 2, which supports, in suitable bearings, the crank shaft 3. Each cylinder contains a piston 4, which is connected to the cranks on the crank shaft by a connecting rod 5 in the usual manner. Both cylinders 1 are covered by a single cylinder head 6, suitably secured on the upper end of the cylinders. In the said cylinder head are located an inlet-valve chamber 7, an exhaust-valve chamber 8, and a steam chamber 9 into which steam enters through a suitable pipe connection 10, and is conveyed to each cylinder through the passages 11 and 12 of the inlet-valve chamber 7. Similar passages 13 and 14 are also provided for the exhaust-valve chamber 8, but for another purpose as will be described later. In each chamber 7 and 8 is fitted a bushing 15. The upper inside halves thereof are cored out, leaving raised portions in the lower halves thereof which are bored out to form valve seats 16 and a clearance 16$^a$. Ports 17 and 18 of the inlet-valve bushing coincide with the passages 11 and 12 to permit steam to pass from the chamber 9 to the cylinders. Ports 17$^a$ of the exhaust bushing coincide with the passages 13 and permit steam to enter the clearance 16$^a$. Ports 18$^a$ coincide with the passage 14 to permit exhaust steam to escape from the cylinder to the exhaust valve. Each end of the valve chambers 7 and 8 is closed by a combined head and packing box 19 which forms a bearing for shaft ends 20 and controller ends 21. Each of the shaft ends 20 has an annular flange 22 at one end adapted to fit the inside of the bushing 15. Valves 23 and 24 are fitted into the bushings 15. The valve 23 is located in the chamber 7 and constitutes the supply or inlet-valve while the valve 24 is located in the chamber 8 and constitutes the exhaust-valve. Each valve consists of a tube open at one end and having an internal flange 25 at the other, by which it is secured to the flange 22 on the shaft 20 by screws or dowels.

Each of the valves 23 and 24 has two series of ports 26 and 27; the series 26 opens into the left cylinder and the series 27 opens into the right cylinder. Each series is set at right angles or quartering to each other. Each valve 23 and 24 is provided, midway of its length, with a recess 28 to assist in balancing the valve and to permit proper lubrication. In admission valve 23 are slotted holes 29 arranged peripherically half way between the ports of each series as shown in Fig. 4, to permit a constant supply of steam to the admission valve. On the outer end of the shafts 20 are secured gears 30 which mesh together and are driven by a train of gears consisting of an idler 31 rigidly secured to a bevel gear 32 which rotates on a stud 33. A pinion 34 meshes with said bevel gear 32 and is secured on a vertical shaft 35 journaled in suitable brackets 36 and 37. The said shaft carries a miter gear 38 which meshes with a miter gear 39 rigidly secured on the crank shaft 3. As there are two ports 26 (or 27) in each series, the gears of the said train are so proportioned that the valves make a half revolution while the crank makes one whole revolution. It will be observed that the space 16ª between the upper half of the bushings and the valves are adapted to be filled with steam, and inasmuch as the area thereof is much larger than the surface exposed on the cylinder side of the valves, the valves will thereby be held firmly seated.

The controller 40 for the inlet-valve 23 consists of a semi-cylindrical body 41 adapted to fit the inside of the valve 23, and having flanges 42 and 43, one at either end. A cross section of the controller 40 is slightly less than a semi-circle to permit perfect seating of the controller as it wears. It also has a flange 44, the diameter of which equals the inside diameter of the bushing 15, adapted to close the open end of the valve 23. A cylindrical extension 21 of the controller 40 extends through the packing nut 19. On the outer end of said extension is secured a rock arm 46 which is connected by a link 47 to a hand lever 48 fulcrumed on a stud 49 extending from the cylinder 1, whereby the steam may be admitted to the cylinder 1 as the valves rotate, as shown in Figs. 10, 11 and 13, or it may be cut off entirely as shown in Fig. 12.

The controller 50 for the exhaust valve 24 consists of a tube 51 closed at one end by a disk 52 which is adapted to fit the valve 24. The radius of the outside of the upper half of the circumference of the tube is reduced to form a clearance 53. The said clearance extends from the disk 52 to a flange 54 on said controller. A flange 55, formed on the tube 51 adjacent to the flange 54, and having an outer diameter equal to the inner diameter of the bushing 15, is adapted to close the open end of the valve 24. A slotted opening 56 in the lower half of the tube 51 forms a port which opens toward the passage 14 into the cylinders 1. A hollow cylindrical extension 21ª of the tube 51 extends through and is journaled in one of the packing nuts 19 and on its outer end is secured a hand lever 57, by means of which the controller 51 may be set to any desired position and secured therein by the clamp 58.

The operation of the mechanism thus shown and described, is as follows: Steam being admitted into the chamber 9 passes through the passages 11 and 13 into the clearance inside the bushings 15 and thereby forces the valves 23 and 24 against their seats 16. Assuming the controller 40 to be in closed position as shown in Fig. 12, steam may enter the inlet valves 23 through one of the ports 26 (or 27) and press the controller 40 onto its seat. To start the engine the controller 40 is turned toward the position shown in Figs. 10 and 11. As before described the valves 23 and 24 rotate in the direction shown by the arrows, and at half the speed of the crank shaft. In the exhaust valve 24, each port 26 (or 27) with the parts 14 and 56 alternately forms a continuous passage from its cylinder 1 to the inside of the controller 50 and thence to the open air. As one of the ports 26 (or 27) passes over the upper half of its revolution, steam is admitted therethrough into the clearance 53 between the controller 50 and the wall of the valve 24 and thus forces the controller 50 against its seat. It is evident that by turning the controller one way or the other an earlier or later exhaust may be effected as desired. It is also evident that by turning the controller 40 in the direction shown in Fig. 13, the engine will run in a direction the reverse to that shown in Fig. 10. It is also evident that a double acting engine can be formed by placing the cylinders in a horizontal position and providing a head and valve system 6 at each end. It is also evident that an indefinite number of cylinders may be used, and steam admitted to, and exhausted from each successively. It is also evident that by causing the steam from one cylinder to exhaust into the next cylinder and so on, that the engine may be compounded.

Having thus described my invention, what I claim is:

1. In valve mechanism for fluid-pressure engines, a cylinder, a head on the cylinder provided with a fluid-pressure supply passage, a cylindrical bushing seated in the head provided with an inlet port leading from said supply passage to the interior of the bushing and said bushing also provided with a supply port leading from the interior of the bushing into the cylinder, a hollow cylindrical valve rotatable in the bushing and constantly open through the latter to said supply passage and provided with a port to intermittently register with the supply port of the bushing to the cylinder as the valve rotates, and a controller journaled in the cylindrical valve to regulate the opening from the interior of the valve through the valve's port and the supply port of the bushing to the cylinder.

2. In valve mechanism for fluid-pressure engines, a cylinder, a head on the cylinder provided with a fluid-pressure supply passage, a cylindrical bushing seated in the head provided with an inlet port leading from said supply passage to the interior of the bushing and said bushing also provided with a supply port leading from the interior of the bushing into the cylinder, valve seats projecting from the inner face of the bushing on opposite sides of the supply port of said bushing and said valve seats forming between them a clearance communicating with the inlet port of the bushing, a hollow cylindrical valve rotatable within the bushing on said valve seats with its interior in communication with said clearance and said rotatable valve provided with a port to register intermittently with the supply port of the bushing to the cylinder as the valve rotates, and a controller journaled in the cylindrical valve to regulate the opening from the interior of the valve through the valve's port and the supply port of the bushing to the cylinder.

3. In valve mechanism for fluid-pressure engines, a cylinder, a head on the cylinder, a cylindrical bushing seated in said head provided with an exhaust port leading to its interior from the cylinder, a hollow cylindrical valve rotatable in the bushing provided with a port to register intermittently with the exhaust port of the bushing as the valve rotates, and a hollow cylindrical controller journaled in the cylindrical valve provided with a slot through its side to register more or less with the exhaust port of the bushing as the controller is turned to regulate the exhaust from the cylinder through the port of the valve and through said slot into the interior of the controller, said controller having an eduction port leading from its interior.

4. In valve mechanism for fluid-pressure engines, a cylinder, a head on the cylinder provided with a fluid-pressure supply passage, a cylindrical bushing seated in the head provided with an exhaust port leading to its interior from the cylinder, valve seats projecting from the inner face of the bushing on opposite sides of the exhaust port of said bushing and said valve seats forming between them a clearance communicating with said supply passage in the head, a hollow cylindrical valve rotatable within the bushing on said valve seats provided with a port to register intermittently with the exhaust port of the bushing as the valve rotates, and a hollow cylindrical controller journaled in the cylindrical valve provided with a slot through its side to register more or less with the exhaust port of the bushing as the controller is turned to regulate the exhaust from the cylinder through the port of the valve and said slot into the interior of the controller, said controller having an exhaust port leading from its interior and also provided with a clearance in its periphery opposite its slot to receive fluid-pressure from said clearance between the valve seats through the port in the valve as the latter rotates.

5. In valve mechanism for fluid-pressure engines, a plurality of cylinders, a head on said cylinders provided with a fluid-pressure supply passage, a cylindrical bushing seated in said head provided with an inlet port leading from the fluid-pressure supply passage to the interior of the bushing and said bushing also provided with a supply port leading from the interior of the bushing into each cylinder, a hollow cylindrical valve rotatable in said bushing and provided with ports intermediate of the adjacent cylinders to form a constantly open communication from the fluid-pressure supply passage through the bushing into the valve, said valve provided with a series of ports for each cylinder to register intermittently with the supply port in the bushing leading to the adjacent cylinder as the valve rotates, the series of ports for one cylinder being arranged opposite to the ports of the series for the adjacent cylinder, and a controller journaled in the cylindrical valve to regulate the communication from the interior of the valve through the different series of ports in the valve and the supply ports of the bushing to the several cylinders.

6. In valve mechanism for fluid-pressure engines, a plurality of cylinders, a head on said cylinders, a cylindrical bushing seated in said head provided with an exhaust port leading to its interior from each cylinder, a hollow cylindrical valve rotatable in said bushing provided with a series of ports for each cylinder with the ports of each series to register intermittently with the exhaust port in the bushing leading from the adjacent cylinder as the valve rotates, the series of ports for one cylinder being arranged opposite to the series of ports for the adjacent cylinder, and a hollow cylindrical controller journaled in the cylindrical valve provided with a longitudinal slot to register more or less with the exhaust ports of the bushing as the controller is turned to regulate the exhaust from the several cylinders through their respective series of exhaust ports in the valve and through said slot into the interior of the controller, said controller being open at one end to provide an eduction port.

In testimony whereof, I have hereunto affixed my signature in the presence of two witnesses.

THAYER B. FARRINGTON.

Witnesses:
 ELLSWORTH C. IRVINE,
 C. E. BLANCHARD.

Copies of this patent may be obtained for five cents each, by addressing the "Commissioner of Patents, Washington, D. C."